(12) United States Patent
Spector et al.

(10) Patent No.: US 11,893,575 B2
(45) Date of Patent: *Feb. 6, 2024

(54) SYSTEMS AND METHODS FOR DYNAMIC INCLUSION OF ENHANCED DATA IN TRANSACTIONS

(71) Applicant: JPMORGAN CHASE BANK, N.A., New York, NY (US)

(72) Inventors: Howard Spector, Street, MD (US); Allison Beer, Bronxville, NY (US); Craig Mullaney, Newark, DE (US); Vimal Brahmbhatt, Middletown, DE (US); Brent Samuels, Avondale, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,646

(22) Filed: Feb. 23, 2023

(65) Prior Publication Data

US 2023/0196338 A1 Jun. 22, 2023

Related U.S. Application Data

(63) Continuation of application No. 15/908,203, filed on Feb. 28, 2018, now Pat. No. 11,620,639.

(Continued)

(51) Int. Cl.
*G06Q 20/36* (2012.01)
*G06Q 20/10* (2012.01)
(Continued)

(52) U.S. Cl.
CPC .......... *G06Q 20/36* (2013.01); *G06Q 20/102* (2013.01); *G06Q 20/204* (2013.01);
(Continued)

(58) Field of Classification Search
None
See application file for complete search history.

(56) References Cited

U.S. PATENT DOCUMENTS 6,494,367 B1 * 12/2002 Zacharias .............. G06Q 20/28
235/382
8,523,059 B1 * 9/2013 Mullen .................. G07F 7/0853
235/379

(Continued)

FOREIGN PATENT DOCUMENTS

| GB | 2530345 A | * | 3/2016 | ............ G06Q 20/10 |
| WO | WO-2013139134 A1 | * | 9/2013 | ........... G06Q 20/322 |
| WO | WO-2014031183 A1 | * | 2/2014 | ............ G06F 21/77 |

*Primary Examiner* — Neha Patel
*Assistant Examiner* — Jahed Ali
(74) *Attorney, Agent, or Firm* — GREENBERG TRAURIG LLP

(57) ABSTRACT

Systems and methods for dynamic inclusion of enhanced data in transactions are disclosed. According to another embodiment, in an information processing apparatus comprising at least one computer processor, a method for conducting a mobile wallet payment with dynamic enhanced data using a mobile payment application may include: (1) receiving, from a merchant point of transaction device, a transaction request from a mobile payment application executed by a mobile electronic device, the transaction request comprising a unique identifier for a financial instrument provisioned to a mobile wallet computer application and a payment option selection; and (2) processing the transaction request according to the payment option selection.

12 Claims, 7 Drawing Sheets

Related U.S. Application Data

(60) Provisional application No. 62/469,135, filed on Mar. 9, 2017, provisional application No. 62/465,683, filed on Mar. 1, 2017.

(51) Int. Cl.

| | | |
|---|---|---|
| *G06Q 20/32* | (2012.01) | |
| *G06Q 30/0207* | (2023.01) | |
| *G06Q 20/38* | (2012.01) | |
| *G06Q 20/20* | (2012.01) | |
| *G06Q 20/40* | (2012.01) | |
| *G06Q 20/22* | (2012.01) | |

(52) U.S. Cl.
CPC ....... *G06Q 20/227* (2013.01); *G06Q 20/3227* (2013.01); *G06Q 20/3278* (2013.01); *G06Q 20/382* (2013.01); *G06Q 20/385* (2013.01); *G06Q 20/3825* (2013.01); *G06Q 20/40* (2013.01); *G06Q 30/0207* (2013.01)

(56) References Cited

U.S. PATENT DOCUMENTS

| | | | | |
|---|---|---|---|---|
| 8,682,802 B1* | 3/2014 | Kannanari | G06Q 20/3274 | 705/64 |
| 9,117,242 B1* | 8/2015 | Ellis | G06Q 40/00 | |
| 10,885,541 B1* | 1/2021 | Ho | G06Q 30/0233 | |
| 11,037,129 B1* | 6/2021 | Chen | G06Q 20/3224 | |
| 2002/0073315 A1* | 6/2002 | Candelore | G06Q 20/367 | 713/172 |
| 2005/0021400 A1* | 1/2005 | Postrel | G06Q 20/3574 | 705/14.27 |
| 2008/0133350 A1* | 6/2008 | White | G06Q 20/20 | 705/14.27 |
| 2008/0133351 A1* | 6/2008 | White | G07G 1/14 | 705/14.27 |
| 2008/0208744 A1* | 8/2008 | Arthur | G06Q 20/32 | 705/41 |
| 2008/0210753 A1* | 9/2008 | Plozay | G06Q 30/02 | 705/14.27 |
| 2009/0157555 A1* | 6/2009 | Biffle | G06Q 20/385 | 705/40 |
| 2010/0257040 A1* | 10/2010 | Hunt | G06Q 30/02 | 705/14.23 |
| 2010/0293381 A1* | 11/2010 | Hammad | G06Q 20/40 | 713/172 |
| 2012/0023567 A1* | 1/2012 | Hammad | G06Q 20/4018 | 726/9 |
| 2012/0028609 A1* | 2/2012 | Hruska | H04W 12/02 | 455/411 |
| 2012/0209749 A1* | 8/2012 | Hammad | G06Q 20/326 | 705/27.1 |
| 2013/0013499 A1* | 1/2013 | Kalgi | G06Q 20/36 | 705/41 |
| 2013/0024371 A1* | 1/2013 | Hariramani | G06Q 20/384 | 705/41 |
| 2013/0024383 A1* | 1/2013 | Kannappan | H04L 9/321 | 705/71 |
| 2013/0030997 A1* | 1/2013 | Spodak | G06Q 20/3572 | 705/41 |
| 2013/0144700 A1* | 6/2013 | VanDeburg | G06Q 30/0225 | 705/14.23 |
| 2013/0151400 A1* | 6/2013 | Makhotin | G06Q 20/3229 | 705/39 |
| 2013/0179243 A1* | 7/2013 | Wescott | G06Q 30/0227 | 705/14.23 |
| 2013/0238455 A1* | 9/2013 | Laracey | G06Q 20/102 | 705/21 |
| 2014/0025457 A1* | 1/2014 | Martinez | G06Q 30/0207 | 705/14.23 |
| 2014/0058937 A1* | 2/2014 | Watson | G06Q 20/425 | 705/41 |
| 2014/0108263 A1* | 4/2014 | Ortiz | G06Q 20/36 | 705/44 |
| 2014/0229375 A1* | 8/2014 | Zaytzsev | G06Q 20/3823 | 705/44 |
| 2014/0250006 A1* | 9/2014 | Makhotin | G06Q 20/326 | 705/41 |
| 2014/0324701 A1* | 10/2014 | Jiang | G06Q 20/3223 | 705/44 |
| 2015/0012426 A1* | 1/2015 | Purves | G02B 27/017 | 705/41 |
| 2015/0046339 A1* | 2/2015 | Wong | G06Q 20/4016 | 705/44 |
| 2015/0052064 A1* | 2/2015 | Karpenko | G06Q 20/3829 | 705/71 |
| 2015/0058146 A1* | 2/2015 | Gaddam | G06Q 20/322 | 705/39 |
| 2015/0120472 A1* | 4/2015 | Aabye | G06Q 20/40 | 705/16 |
| 2015/0254665 A1* | 9/2015 | Bondesen | G06Q 20/367 | 705/44 |
| 2015/0332262 A1* | 11/2015 | Lingappa | G06Q 20/3823 | 705/71 |
| 2016/0092872 A1* | 3/2016 | Prakash | G06Q 20/322 | 705/65 |
| 2016/0210626 A1* | 7/2016 | Ortiz | G06Q 20/12 | |
| 2016/0260083 A1* | 9/2016 | Clark | G06Q 20/3227 | |
| 2016/0260084 A1* | 9/2016 | Main | G06Q 20/401 | |
| 2016/0321653 A1* | 11/2016 | Jacobs | G06Q 20/3224 | |
| 2017/0032370 A1* | 2/2017 | Beltramino | G06Q 20/36 | |
| 2017/0308902 A1* | 10/2017 | Quiroga | G06Q 20/351 | |
| 2018/0068312 A1* | 3/2018 | Kim | G06Q 40/02 | |
| 2018/0108008 A1* | 4/2018 | Chumbley | G06Q 20/36 | |
| 2018/0121908 A1* | 5/2018 | Lin | G06Q 20/4012 | |
| 2018/0158052 A1* | 6/2018 | Tseretopoulos | G06Q 20/38215 | |
| 2019/0130390 A1* | 5/2019 | Bohra | G06Q 20/3272 | |
| 2020/0202331 A1* | 6/2020 | Vudathu | G06Q 20/227 | |

\* cited by examiner

SYSTEMS AND METHODS FOR DYNAMIC INCLUSION OF ENHANCED DATA IN TRANSACTIONS

RELATED APPLICATIONS

This application is a Continuation of U.S. patent application Ser. No. 15/908,203, now U.S. Pat. No. 11,620,639, filed Feb. 28, 2018, which claims priority to U.S. Provisional Patent Application Ser. No. 62/469,135, filed Mar. 9, 2017, and U.S. Provisional Patent Application Ser. No. 62/465,683, filed Mar. 1, 2017, the disclosure of each of which is hereby incorporated, by reference, in its entirety.

BACKGROUND OF THE INVENTION

1. Field of the Invention

The present disclosure generally relates to systems and methods for dynamic inclusion of enhanced data in transactions.

2. Description of the Related Art

EMV transactions improve security against fraud compared to magnetic stripe cards. EMV improves the security of a payment transaction by providing crypographic card authentication. Card data may be replaced with tokens that are not usable by third parties, and have no value outside the transaction.

SUMMARY OF THE INVENTION

Systems and methods for dynamic inclusion of enhanced data in transactions are disclosed. In one embodiment, in an information processing apparatus comprising at least one computer processor, a method of provisioning a mobile wallet into a mobile payment application may include: (1) receiving, from a mobile wallet computer application executed by mobile electronic device, a request to link the mobile wallet computer application to a mobile payment computer application also executed by the mobile electronic device; (2) provisioning a financial instrument for the mobile payment computer application; and (3) delivering the provisioned financial instrument to the mobile payment computer application.

In one embodiment, the financial instrument may be provisioned using in-app provisioning.

In one embodiment, the method may further include delivering additional wallet information to the mobile payment computer application. The additional wallet information may include an identifier for the mobile wallet computer application.

According to another embodiment, in an information processing apparatus comprising at least one computer processor, a method for conducting a mobile payment computer application with a financial instrument provisioned in a mobile wallet computer application may include: (1) receiving, from a merchant point of transaction device, a payment request from a mobile payment computer application executed by a mobile electronic device, the payment request comprising a unique identifier for a financial instrument provisioned to a mobile wallet computer application; (2) receiving, from the mobile payment computer application, a payment option; (3) matching the payment option with the transaction request; and (4) processing the transaction request according to the payment option.

In one embodiment, the payment option may be to pay for at least a portion of the transaction with reward points, a bonus rewards offer, etc.

In one embodiment, the payment request may also include a session identifier.

In one embodiment, the unique identifier may include a cryptogram.

In one embodiment, the payment option may be matched with the transaction request based on a time of the transaction request and a time of the receipt of the payment option.

In one embodiment, the payment option may also include the session identifier, and the payment option may be matched with the transaction request based on the session identifier. In one embodiment, the payment option may be matched with the transaction request using the unique identifier.

According to another embodiment, in an information processing apparatus comprising at least one computer processor, a method for conducting a mobile wallet payment with dynamic enhanced data using a mobile payment application may include: (1) receiving, from a merchant point of transaction device, a transaction request from a mobile payment application executed by a mobile electronic device, the transaction request comprising a unique identifier for a financial instrument provisioned to a mobile wallet computer application and a payment option selection; and (2) processing the transaction request according to the payment option selection.

In one embodiment, the method may further include receiving, from the mobile payment application, the payment option selection; and matching the payment option selection with the transaction request; and In one embodiment, the payment option may be to pay for at least a portion of the transaction with reward points, a bonus rewards offer, etc.

In one embodiment, the payment request may further include a session identifier.

In one embodiment, the unique identifier may include a cryptogram, and the cryptogram may include a payment option selection indicator for the payment option selection.

In one embodiment, the payment option may include the session identifier, and the payment option may be matched with the transaction request based on the session identifier.

According to another embodiment, in an information processing apparatus comprising at least one computer processor, a method for conducting a mobile wallet payment using a mobile payment application may include: (1) receiving, from a merchant point of transaction device, a payment request from a mobile payment application executed by a mobile electronic device, the payment request comprising an identifier for a financial instrument provisioned to a mobile wallet computer application; (2) receiving, from the mobile payment application, a payment option selection; (3) matching the payment option selection with the transaction request; and (4) processing the transaction request according to the payment option selection.

In one embodiment, the payment option may be to pay for at least a portion of the transaction with reward points, a bonus rewards offer, etc.

In one embodiment, the payment option may be matched with the transaction request based on a time of the transaction request and a time of the receipt of the payment option.

In one embodiment, the payment request may be a merchant identifier, and the payment option may be matched to the transaction request based on the merchant identifier.

According to another embodiment, in an information processing apparatus comprising at least one computer processor, a method for processing mobile wallet payments using a mobile payment application may include: (1) receiving a transaction request from a merchant comprising a unique identifier for a financial instrument provisioned to a mobile wallet computer application; (2) receiving, from the mobile payment application, a payment option selection; (3) matching the payment option selection with the transaction request; and (4) processing the transaction request according to the payment option selection.

In one embodiment, the unique identifier may include a cryptogram, and the cryptogram may include an indicator of a payment option selection.

In one embodiment, the method may further include receiving, with the unique identifier, a dynamic indicator comprising an indicator of a payment option selection.

In one embodiment, the transaction request may include a session identifier, and the payment option may be matched with the transaction request based on the session identifier.

In one embodiment, the payment option may be matched with the transaction request using the unique identifier.

In one embodiment, the method may further include providing a rewards point balance for the financial instrument to the merchant.

In one embodiment, the method may further include processing a remaining balance following the processing the transaction request according to the payment option selection with the financial instrument.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for dynamic inclusion of enhanced data in transactions.

Figure 1:
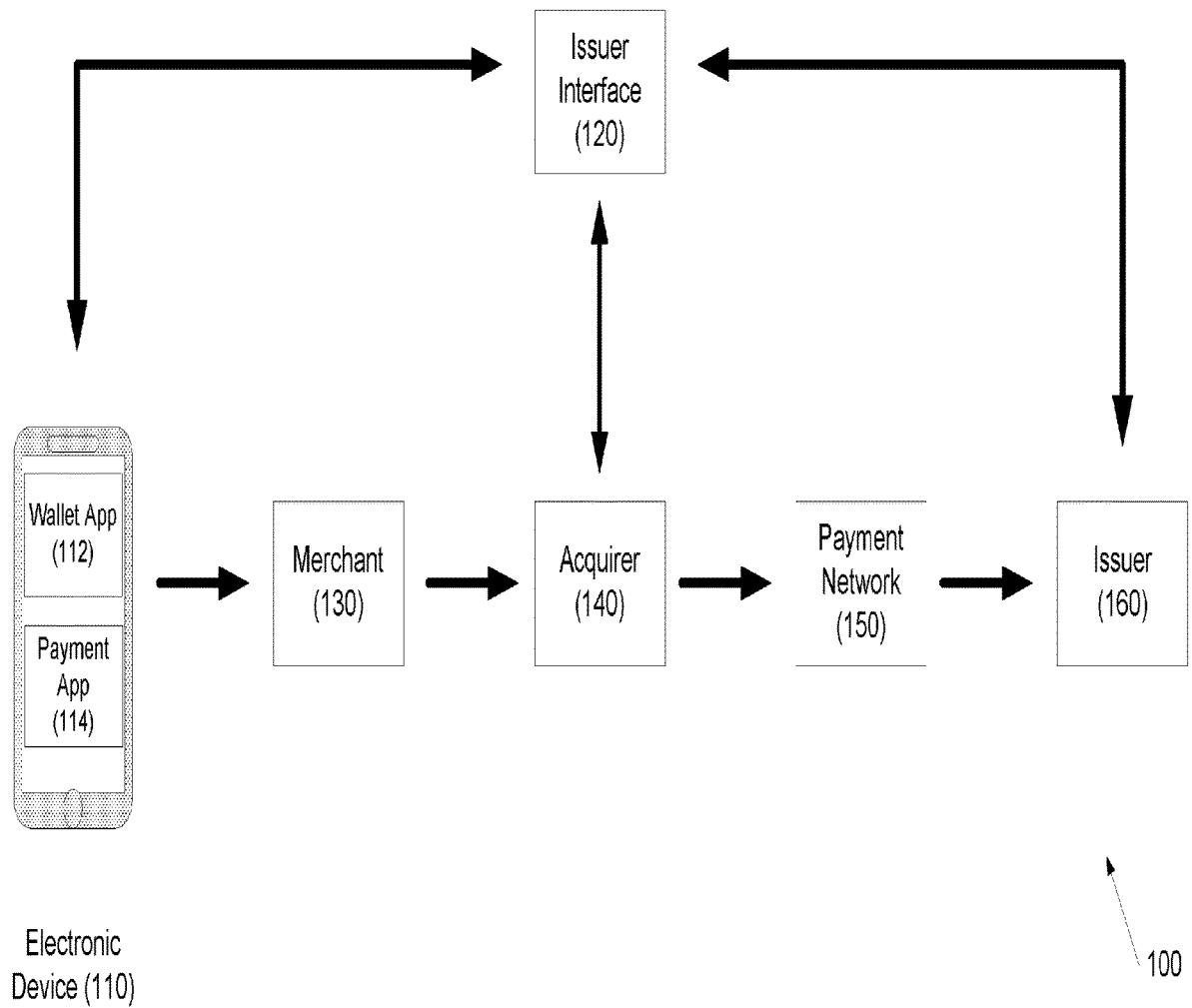
FIG. 1 depicts a diagram of a system for dynamic inclusion of enhanced data in transactions according to one embodiment.

Referring to FIG. 1, a system for dynamic inclusion of enhanced data in transactions is disclosed according to one embodiment. System 100 may include electronic device 110, which may be a mobile device (e.g., smartphone tablet computer, a smart watch, etc.), an Internet of Things ("IoT") appliance, etc. Electronic device 110 may execute one or more computer programs, or applications, such as electronic wallet application 112, payment application 114, etc.

Electronic device 110 may communicate with issuer interface 120, which may provide services, such as online services, for issuer 160. Electronic device 110 may communicate with issuer interface 120 using one or more of the computer programs or applications, and may communicate using any suitable communication network (e.g., cellular, WiFi, etc.).

Electronic device 110 may also communicate with merchant 130, which may be located at a physical location (e.g., a brick and mortar location), online, etc. Electronic device 110 may communicate with merchant 130 using one or more of the computer programs or applications, and may communicate using any suitable communication network (e.g., cellular, WiFi, NFC, Bluetooth, etc.).

Merchant 130 may provide a point of transaction device, such as a point of sale device, for interacting with the customer and electronic device 110.

Acquirer 140 may communicate with merchant 130 using, for example, payment network 150. In one embodiment, acquirer 140 may be associated with, or part of, issuer 160.

Issuer 160 may issue a financial instrument to a user of electronic device 110. In one embodiment, the financial instrument may be provisioned as a token to electronic device 110.

Figure 2:
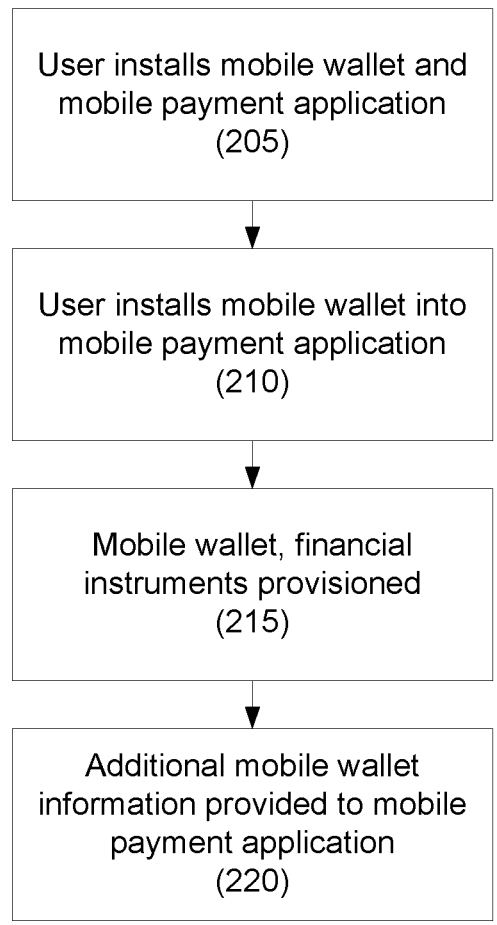
FIG. 2 depicts a method for provisioning a mobile wallet into a mobile payment application according to one embodiment.

Referring to FIG. 2, a method of provisioning a mobile wallet into a mobile payment application is disclosed according to one embodiment. In step 205, a user may install both a mobile wallet and a mobile payment application on a mobile electronic device. An example of a mobile payment application is ApplePay, and an example of a mobile wallet is ChasePay. Other mobile wallets and mobile payment applications may be used as is necessary and/or desired.

In step 210, the user may install, link, or connect the mobile wallet to the mobile payment application. For example, the user may have one or more financial instruments provisioned in the mobile wallet, and may install or put the mobile wallet functionality and financial instruments into the mobile payment application.

In step 215, the mobile wallet and the financial instruments may then be provisioned into the mobile payment application using, for example, in-application provisioning.

In step 220, additional mobile wallet information, such as a mobile wallet identifier, mobile electronic device information, wallet level specifications, unique identifiers, risk factors, geographic parameters, etc. may be communicated to the mobile payment application.

Figure 3:
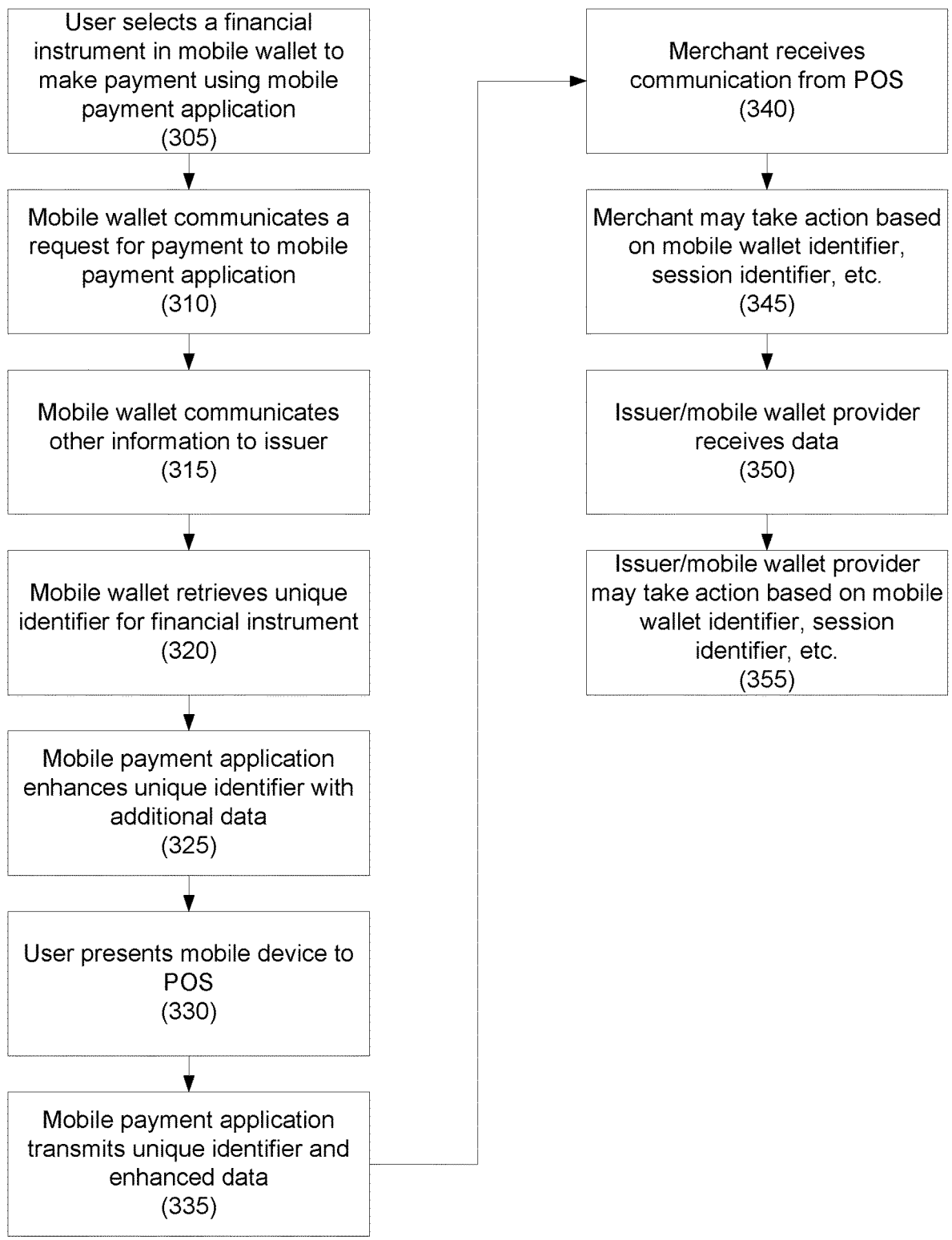
FIG. 3 depicts a method of conducting a mobile wallet payment with dynamic enhanced data using a mobile payment application according to one embodiment.

Referring to FIG. 3, a method of conducting a mobile wallet payment with dynamic enhanced data using a mobile payment application is disclosed according to one embodiment.

In step 305, the user may use the customer's mobile wallet application to make a payment. For example, the user may select a financial instrument from the mobile wallet application, and may select an option to pay with a mobile payment application.

In one embodiment, the user may select one or more payment options that may be specific to the financial instrument or mobile wallet application, such as pay with reward points or dollars, receive additional rewards (e.g., bonus rewards), accepting a promotion, etc.

In one embodiment, the selection of the payment option may be dynamic in that it may vary from transaction to transaction.

In step 310, the mobile wallet may communicate a request for payment along with a session identifier, the identification of the financial instrument, and any other information as necessary and/or desired to the mobile payment application. Other information may include, for example, a pay with points indicator, or any other information as is necessary and/or desired.

In step 315, the mobile wallet may communicate any other payment options (e.g., pay with points, etc.) to a financial institution (e.g., the issuer). In one embodiment, this may be communicated to the issuer's interface and then to the issuer.

In step 320, the mobile payment application may retrieve data, such as a unique identifier for the financial instrument from the mobile device's secure element or other secure storage, and may prepare the data to be transmitted by, for example, NFC, to the point of transaction device. For example, the unique identifier may be a cryptogram.

An example of a cryptogram that may be used is provided in U.S. Patent Application Ser. No. 62/552,506, the disclosure of which is hereby incorporated, by reference, in its entirety.

In step 325, the mobile payment application may enhance the unique identifier with mobile wallet information, including, for example, the mobile wallet identifier, the session identifier, etc.

In one embodiment, the unique identifier may be enhanced with an indicator reflecting the selection of the payment option.

In step 330, the user may present the user's mobile device to a point of transaction device and initiate payment. For example, the user may tap the point of transaction device while being biometrically authenticated, etc. Any suitable manner of initiating payment may be used as is necessary and/or desired.

In step 335, the mobile wallet may transmit the unique identifier and any other enhanced data to the point of transaction device using, for example, NFC.

In one embodiment, the merchant may receive rewards information in order to support a deeply integrated solution with the issuer. For example, the merchant may support rewards point processing directly, and, in one embodiment, may receive rewards point information (e.g., points balance, points earned, etc.) from the issuer. The merchant may provide this information to the user on, for example, a receipt, on a display, in a separate communication (e.g., text), in a merchant app, etc.

In step 340 the merchant's backend may receive the transmission from the point of transaction device, which may include the mobile wallet identifier, the session identifier, and any other enhanced data as is necessary and/or desired.

In step 345, the merchant may take any other actions as is necessary and/or desired based on the mobile wallet identifier, the session identifier, etc., such as retrieving rewards information, retrieving customer information from the issuer/mobile wallet provider, etc. For example, the merchant may retrieve rewards information from the issuer and may present the rewards information to the user (e.g., print on receipt, display in app, display on screen, etc.).

In step 350, the unique identifier and the enhanced data may be communicated from the merchant to the issuer/mobile wallet provider.

In step 355, the issuer/mobile wallet provider may take any additional actions as is necessary and/or desired based on the mobile wallet identifier, the session identifier, etc. For example, the issuer may analyze the unique identifier and/or the enhanced data to identify a payment instruction for the transaction.

In another embodiment, if necessary (e.g., the issuer/mobile wallet provider cannot identify the payment instruction from the data received from the merchant), the issuer may match the transaction from the merchant with transaction data received from the mobile wallet to identify the payment instructions. This will be discussed in greater detail below.

Figure 4:
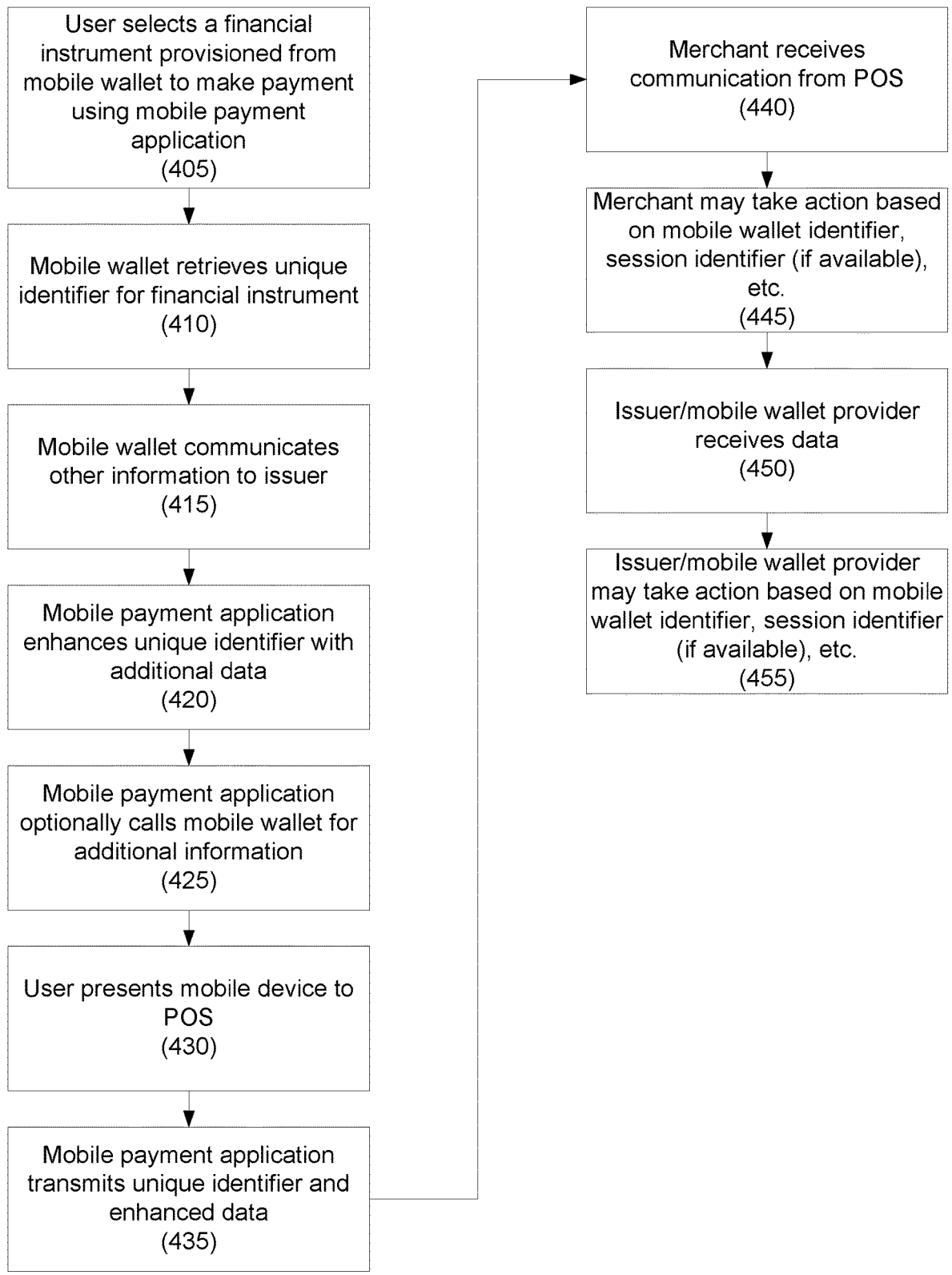
FIG. 4 depicts a method of conducting a mobile wallet payment with dynamic enhanced data using a mobile payment application according to one embodiment.

Referring to FIG. 4, a method for conducting a mobile wallet payment with dynamic enhanced data using a mobile payment application is disclosed according to one embodiment. In FIG. 4, a user may initiate payment using the mobile payment application with a payment instrument that was provisioned using the mobile wallet.

In step 405, using the mobile payment application, a user may select a financial instrument provisioned from mobile wallet to make payment using mobile payment application. The user may also select a payment option as discussed above. In one embodiment, the selection of the payment option may be dynamic in that it may vary from transaction to transaction.

In step 410, the mobile payment application may retrieve data, such as a unique identifier for the financial instrument from the mobile device's secure element or other secure storage, and may prepare the data to be transmitted by, for example, NFC, to the point of transaction device. For example, the unique identifier may be a cryptogram, as described above.

In step 415, the mobile wallet may communicate any other payment options (e.g., pay with points, etc.) to a financial institution (e.g., the issuer). In one embodiment, this may be communicated to the issuer's interface and then to the issuer.

In step 420, the mobile payment application may enhance the NFC data with the mobile wallet identifier that was provided with the mobile wallet was provisioned to the mobile payment application. In one embodiment, the NFC data may be enhanced with the selected payment option.

In one embodiment, in step 425, the mobile payment application may call the mobile wallet to retrieve additional information, such as a session identifier, etc.

In step 430, the user may present the user's mobile device to a point of transaction device and initiate payment. For example, the user may tap the point of transaction device while being biometrically authenticated, etc. Any suitable manner of initiating payment may be used as is necessary and/or desired.

In step 435, the mobile wallet may transmit the unique identifier and enhanced data to the point of transaction device using, for example, NFC. As noted above, the additional data may include the mobile wallet identifier, and, if retrieved from the mobile wallet, as session identifier.

In step 440, the merchant may receive the transmission from the point of transaction device, which may include the mobile wallet identifier, the session identifier, and any other data as is necessary and/or desired.

In step 445, the merchant may take any other actions as is necessary and/or desired based on the mobile wallet identifier, the session identifier (if available), etc., such as retrieving rewards information, etc. In one embodiment, the merchant may present the rewards information to the user (e.g., by printing it on a receipt, by displaying it in an app, etc.).

In step 450, the unique identifier and the enhanced data may be communicated from the merchant to the issuer/mobile wallet provider.

In step 455, the issuer/mobile wallet provider may take any additional actions as is necessary and/or desired based on the mobile wallet identifier, the session identifier (if available), etc. In one embodiment, because it includes a mobile wallet identifier, the issuer/mobile wallet provider may recognize the transaction to be one from a financial instrument that was provisioned from the mobile wallet. For example, the issuer/mobile wallet provider may reimburse the merchant for network fees or similar fees, or take any other action that is necessary and/or desired.

In one embodiment, the issuer may match the transaction with the payment instructions, and may process the transaction according to payment instructions. This will be discussed in greater detail below.

Figure 5:
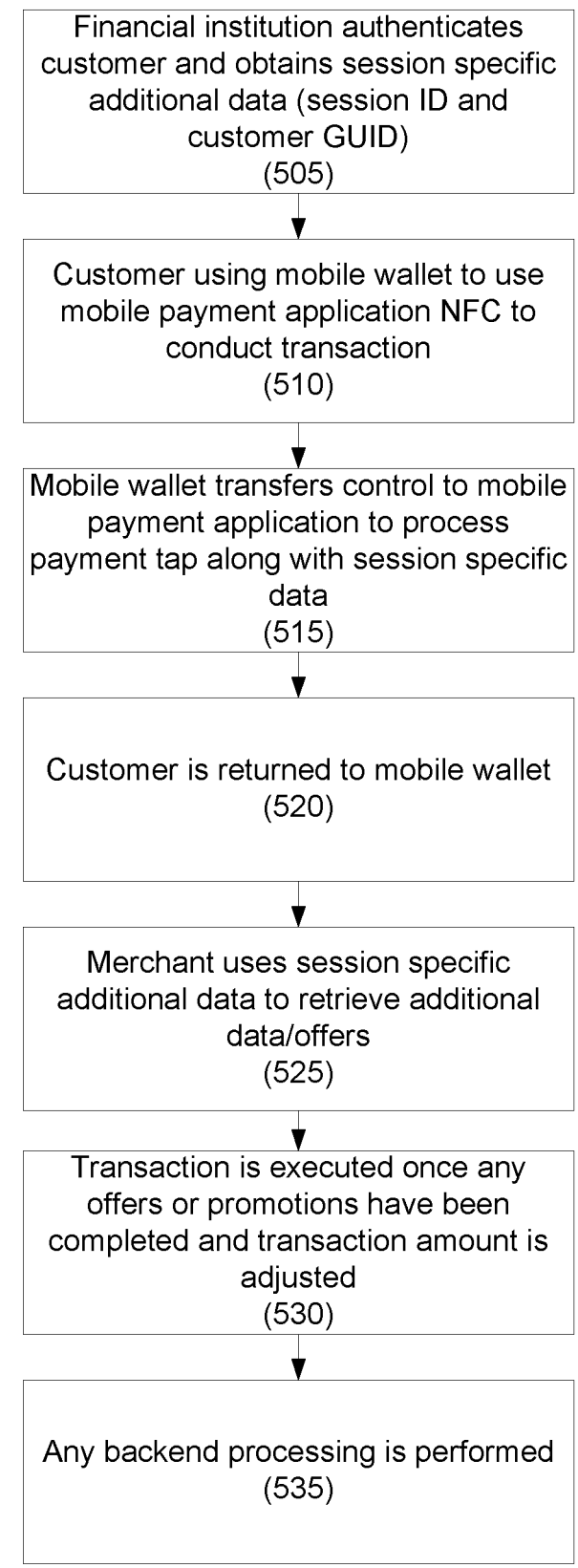
FIG. 5 depicts a method for conducting a mobile wallet payment using a mobile payment application with "in field" data elements according to one embodiment.

Referring to FIG. 5, a method for conducting a mobile wallet payment using a mobile payment application with "in field" data elements is disclosed according to one embodiment.

In step 505, a financial institution (e.g., an issuer) may authenticate a customer by any suitable manner (e.g., signing in to a mobile wallet, etc.) and may obtain a session ID and/or customer globally unique ID, or GUID.

In step 510, the customer may select a wireless payment option (e.g., NFC) using a mobile payment application (e.g., ApplePay). In step 515, the mobile wallet (e.g., Chase Pay) may transfer control to the mobile payment application along with the session specific additional data (e.g., session ID, GUID) to process a payment request (e.g., a "tap").

In step 520, the customer may then be returned to the mobile wallet.

In step 525, the merchant may retrieve any session specific additional data/offers from the merchant and may present them to the user. Examples include loyalty offers, promotions, etc. In one embodiment, this may be in real-time and before the purchase is completed.

In step 530, the merchant may communicate the selection of any additional offer to the issuer, and the transaction may be executed after any offers or promotions have been applied/completed and transaction amount is adjusted.

In step 535, any backend processing (e.g., pay with points, etc.) may be performed as necessary and/or desired. For example, the issuer may match the transaction from the merchant with the transaction from the mobile wallet as will be discussed below.

Figure 6:
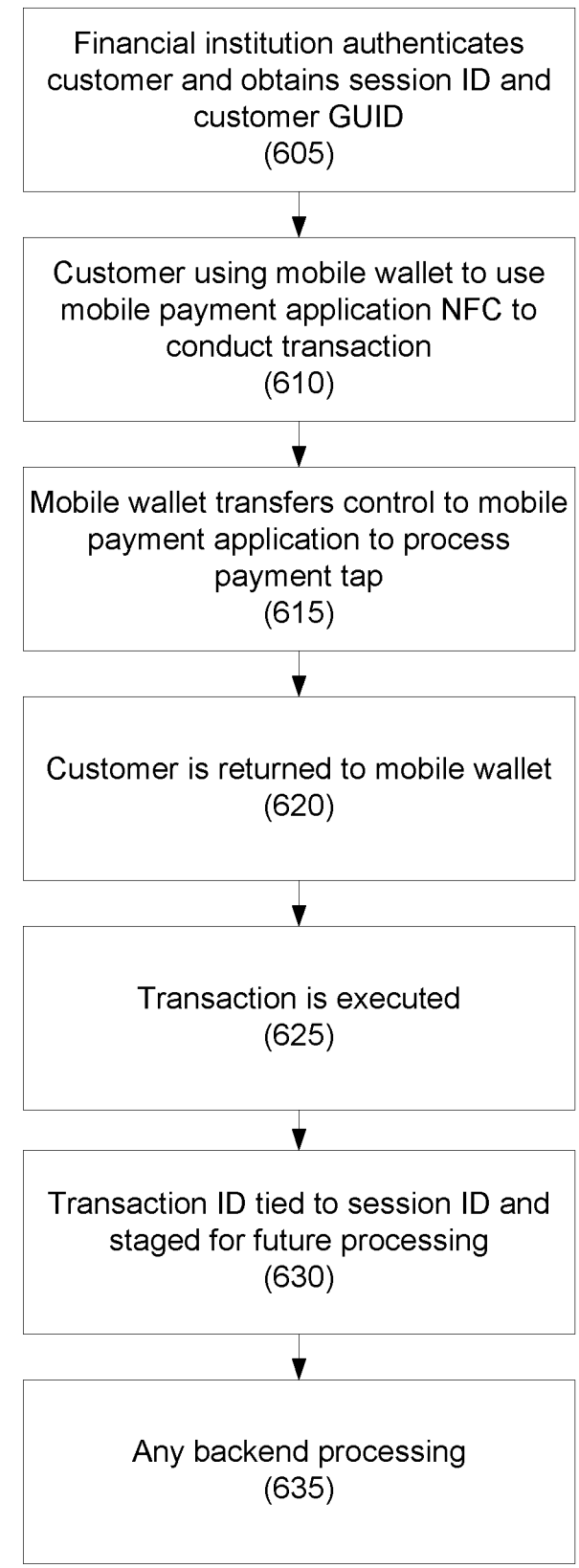
FIG. 6 depicts a method for conducting a mobile wallet payment using a mobile payment application without in field data elements according to one embodiment.

Referring to FIG. 6, a method for conducting a mobile wallet payment using a mobile payment application without in field data elements is disclosed according to one embodiment.

In step 605, a financial institution may authenticate a customer by any suitable manner (e.g., signing in to a mobile wallet, etc.) and may obtain a session ID and/or customer globally unique ID, or GUID.

In step 610, the customer may elect to use wireless payment (e.g., NFC) using a mobile payment application (e.g., ApplePay). In step 615, the mobile wallet (e.g., Chase Pay) may transfer control to the mobile payment application to process a payment request (e.g., a "tap") without session specific additional data (e.g., session ID, GUID).

In step 620, the customer may then be returned to the mobile wallet.

In step 625, the transaction may be executed by communicating the transaction data to the issuer's backend.

In step 630, the transaction ID may be associated with or tied to the session and may be staged for future processing (e.g., rewards, loyalty points, promotions, etc.).

In step 635, the issuer may process the transaction according to the payment instructions. In one embodiment, the issuer may match the transaction received from the merchant with the transaction received from the mobile wallet application as discussed below.

Figure 7:
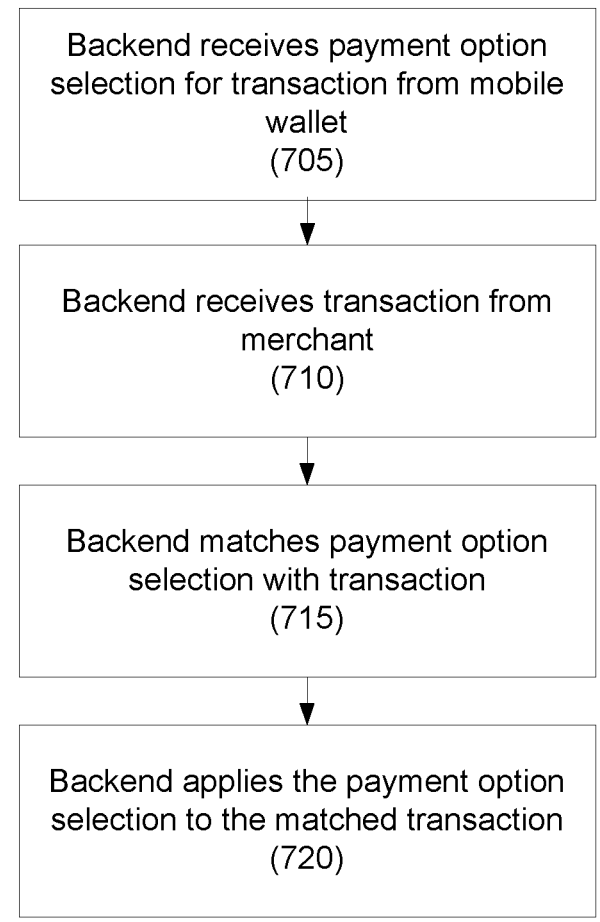
FIG. 7 depicts a processing payments at a backend according to one embodiment.

Referring to FIG. 7, a method for processing payments at a backend is disclosed according to one embodiment.

In step 705, a backend for an issuer (e.g., a financial institution) may receive a payment option selection from the user's mobile wallet. For example, the payment option selection may be pay with reward points, apply a promotion, apply a discount, etc. In one embodiment, the selection of the payment option may be dynamic in that it may vary from transaction to transaction.

In one embodiment, each transaction may be received individually, or the transactions may be received in a batch.

In one embodiment, the payment option may identify transaction data, such as the financial instrument selected, the time of transaction, a merchant identifier, etc.

In step 710, the backend may receive a transaction from the merchant. In one embodiment, the transaction may include a unique identifier (e.g., a cryptogram), additional information (e.g., dCVV), an indicator of a payment option selection, a merchant identifier, a transaction time, a transaction identifier, a session identifier, etc.

In one embodiment, the backend may receive an identifier, such as a single use account number, from the merchant.

In step 715, the issuer backend may match a transaction that is received from the merchant with the transaction received from the mobile wallet application. For example, the issuer backend may review the transaction from the merchant to identify a payment option from the unique identifier, additional information, a transaction identifier, a session identifier, etc.

In another embodiment, if the backend cannot identify a payment option (e.g., the backend received an identifier without payment options), the backend may use other data to correlate the transaction with the payment option received from the mobile payment application. For example, the backend may match the time of payment option selection with the time of transaction. In order to account for timing differences, a tolerance (e.g., 1 hour, 2 hours, 4 hours, etc.) may be incorporated into the matching process.

In another embodiment, the backend may match a merchant identifier from the merchant transaction with a merchant identifier received from the mobile payment application.

Other techniques for matching a transaction from a merchant with a transaction from a mobile wallet may be used as is necessary and/or desired.

In step 720, the backend may apply the payment option selection to the matched transaction and may conduct the transaction. For example, if the payment option is to pay with points or a discount, the transaction cost may be decreased by the amount selected. If the payment option is for increased rewards, the transaction may be conducted for the amount and additional points may be awarded.

It should be recognized that although several embodiments have been disclosed, these embodiments are not exclusive and aspects of one embodiment may be applicable to other embodiments.

The following documents are hereby incorporated, by reference, in their entireties: U.S. patent application Ser. No. 15/362,019; U.S. patent application Ser. No. 15/069,418; U.S. patent application Ser. No. 14/699,511, U.S. Provisional Patent Application Ser. No. 62/148,493; U.S. Provisional Patent Application Ser. No. 62/107,800; U.S. Provisional Patent Application Ser. No. 62/037,891; U.S. patent application Ser. No. 15/069,458; U.S. patent application Ser.

No. 15/088,437; U.S. patent application Ser. No. 15/158,720; U.S. patent application Ser. No. 15/345,942; U.S. Patent Application Ser. No. 62/331,564; U.S. patent application Ser. No. 15/131,979; and U.S. Patent Application Ser. No. 62/312,204.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a cardholder or cardholders of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "cardholder interfaces" may be utilized to allow a cardholder to interface with the processing machine or machines that are used to implement the invention. As used herein, a cardholder interface includes any hardware, software, or combination of hardware and software used by the processing machine that allows a cardholder to interact with the processing machine. A cardholder interface may be in the form of a dialogue screen for example. A cardholder interface may also include any of a mouse, touch screen, keyboard, keypad, voice reader, voice recognizer, dialogue screen, menu box, list, checkbox, toggle switch, a pushbutton or any other device that allows a cardholder to receive information regarding the operation of the processing machine as it processes a set of instructions and/or provides the processing machine with information. Accordingly, the cardholder interface is any device that provides communication between a cardholder and a processing machine. The information provided by the cardholder to the processing machine through the cardholder interface may be in the form of a command, a selection of data, or some other input, for example.

As discussed above, a cardholder interface is utilized by the processing machine that performs a set of instructions such that the processing machine processes data for a cardholder. The cardholder interface is typically used by the processing machine for interacting with a cardholder either to convey information or receive information from the cardholder. However, it should be appreciated that in accordance with some embodiments of the system and method of the invention, it is not necessary that a human cardholder actually interact with a cardholder interface used by the processing machine of the invention. Rather, it is also contemplated that the cardholder interface of the invention might interact, i.e., convey and receive information, with another processing machine, rather than a human cardholder. Accordingly, the other processing machine might be characterized as a cardholder. Further, it is contemplated that a cardholder interface utilized in the system and method of the invention may interact partially with another processing machine or processing machines, while also interacting partially with a human cardholder.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting a mobile wallet payment with dynamic enhanced data using a mobile payment application, comprising:

communicating, by a mobile wallet computer application for a financial instrument issuer, a mobile wallet computer application identifier for the mobile wallet computer application to a mobile payment application thereby linking the mobile wallet computer application and the mobile payment application, the mobile wallet computer application and the mobile payment application executed by a mobile electronic device for a customer;

receiving, by the mobile wallet computer application and from the customer, a selection of a financial instrument that is provisioned to the mobile wallet computer application and an instruction to pay for a transaction with rewards points that are associated with the selected financial instrument;

communicating, by the mobile wallet computer application, the selection of the financial instrument to the mobile payment application;

receiving, by a backend for the financial instrument issuer comprising at least one computer processor and from the mobile wallet computer application over a first communication network, a first communication comprising the instruction and the mobile wallet computer application identifier;

receiving, by the backend and from a merchant point of transaction device for a merchant over a second communication network, a second communication comprising a transaction request for the transaction that was received by the merchant point of transaction device from the mobile payment application, the transaction request comprising a unique identifier for the financial instrument and the mobile wallet computer application identifier;

matching, by the backend, the first communication and the second communication using the mobile wallet computer application identifier; and processing the transaction request according to the instruction.

2. The method of claim 1, wherein the instruction is to pay for at least a portion of the transaction with reward points.

3. The method of claim 1, wherein the instruction is a bonus rewards offer.

4. The method of claim 1, wherein the unique identifier comprises a cryptogram, and the cryptogram comprises an instruction selection indicator for the instruction.

5. A method for conducting a mobile wallet payment with dynamic enhanced data, comprising:

communicating, by a mobile wallet computer application for a financial instrument issuer, a mobile wallet computer application identifier for the mobile wallet computer application to a mobile payment application thereby linking the mobile wallet computer application and the mobile payment application, the mobile wallet computer application and the mobile payment application executed by a mobile electronic device for a customer;

receiving, by the mobile wallet computer application and from the customer, a selection of a financial instrument that is provisioned to the mobile wallet computer application and an instruction to pay for a transaction with rewards points that are associated with the selected financial instrument;

communicating, by the mobile wallet computer application, the selection of the financial instrument to the mobile payment application;

receiving, by a backend for the financial instrument issuer comprising at least one computer processor and from the mobile wallet computer application over a first communication network at a first time, a first communication comprising the instruction;

receiving, by the backend and from a merchant point of transaction device for a merchant over a second communication network at a second time, a second communication comprising a transaction request for the transaction that was received by the merchant point of transaction device from the mobile payment application, the transaction request comprising a unique identifier for the financial instrument;

matching, by the backend, the first communication to the second communication in response to the first time and the second time being received within a time tolerance; and processing the transaction request according to the instruction.

6. The method of claim 5, wherein the instruction is to pay for at least a portion of the transaction with reward points.

7. The method of claim 5, wherein the instruction is a bonus rewards offer.

8. The method of claim 5, wherein the unique identifier comprises a cryptogram, and the cryptogram comprises an instruction indicator for the instruction.

9. A system, comprising:

a mobile electronic device comprising a computer processor executing a mobile wallet computer application and a mobile payment application, the mobile wallet computer application having a mobile wallet computer application identifier, the mobile electronic device associated with a customer; and a backend for a financial instrument issuer comprising at least one computer processor in communication with the mobile wallet computer application over a first communication network and a merchant point of transaction device over a second communication network;

wherein:

the mobile wallet computer application communicates the mobile wallet computer application identifier to the mobile payment application thereby linking the mobile wallet computer application and the mobile payment application;

the mobile wallet computer application receives, from the customer, a selection of a financial instrument and an instruction to pay for a transaction with rewards points that are associated with the selected financial instrument;

the mobile wallet computer application communicates the selection of the financial instrument to the mobile payment application;

the backend for the financial instrument issuer receives, from the mobile wallet computer application over a first communication network at a first time, a first communication comprising the instruction;

the backend for the financial instrument issuer receives, from a merchant point of transaction device for a merchant over a second communication network at a second time, a second communication comprising a transaction request for the transaction that was received by the merchant point of transaction device from the mobile payment application, the transaction request comprising a unique identifier for the financial instrument;

the backend for the financial instrument issuer matches the first communication to the second communication in response to the first time and the second time being received within a time tolerance; and the backend for a financial instrument issuer processes the transaction request according to the instruction.

10. The system of claim 9, wherein the instruction is to pay for at least a portion of the transaction with reward points.

11. The system of claim 9, wherein the instruction is a bonus rewards offer.

12. The system of claim 9, wherein the unique identifier comprises a cryptogram, and the cryptogram comprises an instruction selection indicator for the instruction.

* * * * *